(12) United States Patent
Zhang et al.

(10) Patent No.: US 11,610,401 B2
(45) Date of Patent: Mar. 21, 2023

(54) ACQUIRING PUBLIC OPINION AND TRAINING WORD VISCOSITY MODEL

(71) Applicant: BEIJING BAIDU NETCOM SCIENCE AND TECHNOLOGY CO., LTD., Beijing (CN)

(72) Inventors: Wenjun Zhang, Beijing (CN); Qiang Huang, Beijing (CN); Jun Fang, Beijing (CN); Xu Pan, Beijing (CN); Yuncong Li, Beijing (CN); Zhe Yang, Beijing (CN); Saiding Hong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/206,967

(22) Filed: Mar. 19, 2021

(65) Prior Publication Data

US 2022/0101009 A1 Mar. 31, 2022

(30) Foreign Application Priority Data

Sep. 30, 2020 (CN) .......................... 202011058837.3

(51) Int. Cl.
*G06V 20/40* (2022.01)
*G06V 40/16* (2022.01)
(Continued)

(52) U.S. Cl.
CPC ........... *G06V 20/43* (2022.01); *G06K 9/6215* (2013.01); *G06V 40/172* (2022.01); *G06V 30/10* (2022.01)

(58) Field of Classification Search
CPC ........ G06V 20/43; G06V 20/40; G06V 20/62; G06V 20/635; G06V 20/41; G06V 40/172;
(Continued)

(56) References Cited

U.S. PATENT DOCUMENTS

| | | | |
|---|---|---|---|
| 2017/0286541 A1* | 10/2017 | Mosley | G06Q 50/01 |
| 2019/0043504 A1* | 2/2019 | Li | G10L 15/183 |
| 2019/0188478 A1* | 6/2019 | Liu | G06V 20/635 |

FOREIGN PATENT DOCUMENTS

| | | |
|---|---|---|
| CN | 101021857 A | 8/2007 |
| CN | 107577663 A | 1/2018 |

(Continued)

*Primary Examiner* — Edward F Urban
*Assistant Examiner* — Wassim Mahrouka
(74) *Attorney, Agent, or Firm* — Seed IP Law Group LLP (57) ABSTRACT

A public opinion acquisition method and device, a word viscosity model training method and device, a server, and a medium are provided in the present disclosure. And the present disclosure relates to the technical field of artificial intelligence, specifically to image recognition and natural language processing, which can be used in a cloud platform. A video public opinion acquisition method includes: receiving a public opinion acquisition request, the public opinion acquisition request including a public opinion keyword to be acquired; matching the public opinion keyword to be acquired with video data including a recognition result, wherein the recognition result is obtained by performing predefined content recognition on the video data, the predefined content recognition including text recognition and image recognition; and determining video data that matches with the public opinion keyword to be acquired as result video data.

18 Claims, 5 Drawing Sheets

(51) Int. Cl.
*G06K 9/62* (2022.01)
*G06V 30/10* (2022.01)

(58) Field of Classification Search
CPC .... G06V 40/166; G06V 30/10; G06K 9/6215; G06K 9/6201; G06K 9/6232; G06K 9/6256; G06K 9/6277; G06F 40/284; G06F 40/30; G06F 40/216; G06F 40/289; G06F 16/953; G10L 2015/088; G06N 3/0454; G06N 3/08; G06N 20/20
See application file for complete search history.

(56) References Cited

FOREIGN PATENT DOCUMENTS

| | | |
|---|---|---|
| CN | 105095211 B | 3/2019 |
| CN | 109829033 A | 5/2019 |
| CN | 110837581 A | 2/2020 |
| CN | 110929683 A | 3/2020 |
| CN | 108182211 B | 6/2020 |

* cited by examiner

ACQUIRING PUBLIC OPINION AND TRAINING WORD VISCOSITY MODEL

CROSS REFERENCE TO RELATED APPLICATION

This application claims priority to Chinese Patent Application No. 2020110588373, filed on Sep. 30, 2020, the contents of which are hereby incorporated by reference in their entirety for all purposes.

BACKGROUND

Technical Field

The present disclosure relates to the technical field of artificial intelligence, specifically to image recognition and natural language processing, and particularly to a public opinion acquisition method and device, a word viscosity model training method and device, a server, and a medium.

Description of the Related Art

A public opinion monitoring system mainly collects text-type public opinion information from various media websites, social platforms, and mobile terminals. However, with the development of technologies, more and more public opinion information is published and disseminated in a manner of rich media, such as videos. Existing public opinion products also identify video data based on its surrounding texts, such as a video title, a video description, etc., to perform, according to keywords and recognition information input by a user, matching and recalling, and lack of understanding of the video content itself. Moreover, although the existing public opinion products can realize the recognition and matching of text types, the recognition and matching of text types are generally simple, and description deviations easily occur; and information mining for video data is not sufficient, which may render final public opinion prediction precision not accurate enough, thereby failing to recall a content mentioned or displayed in a video, and resulting in a low recall rate of the system.

The methods described in this section are not necessarily those that have been previously conceived or adopted. Unless otherwise indicated, it should not be assumed that any method described in this section is considered being the related art simply because it is included in this section. Similarly, unless otherwise specified, the problems mentioned in this section should not be considered being recognized in any related art.

BRIEF SUMMARY

According to an aspect of the present disclosure, a video public opinion acquisition method is provided, including: receiving a public opinion acquisition request, the public opinion acquisition request including a public opinion keyword to be acquired; matching the public opinion keyword to be acquired with video data including a recognition result, wherein the recognition result is obtained by performing predefined content recognition on the video data, the predefined content recognition including text recognition and image recognition; and determining video data that matches with the public opinion keyword to be acquired as result video data.

According to an aspect of the present disclosure, a word viscosity model training method is provided, including: performing word segmentation on a text corpus to obtain a plurality of word pairs as a training sample, a word pair of the plurality of word pairs including a previous word and a latter word; training a word viscosity model based on the training sample to cause the word viscosity model to output a probability that each word pair can form a key phrase; and training the word viscosity model by gradient descent, until the word viscosity model meets a preset condition, wherein the preset condition includes a preset precision or a preset number of training.

According to an aspect of the present disclosure, a video public opinion acquisition device is provided, including: a receiving unit, configured to receive a public opinion acquisition request, wherein the public opinion acquisition request includes a public opinion keyword to be acquired; a matching unit, configured to match the public opinion keyword to be acquired with video data including a recognition result, wherein the recognition result is obtained by performing predefined content recognition on the video data, the predefined content recognition including text recognition and image recognition; and a determination unit, configured to determine video data that matches with the public opinion keyword to be acquired as result video data.

According to an aspect of the present disclosure, a word viscosity model training device is provided, including: a sampling unit, configured to perform word segmentation on a text corpus to obtain a plurality of word pairs as a training sample, the word pair thereof including a previous word and a latter word; a training unit, configured to train a word viscosity model based on the training sample to cause the word viscosity model to output a probability that each word pair can form a key phrase; and a response unit, configured to train the word viscosity model by gradient descent, and stop the training till the word viscosity model meets a preset condition, wherein the preset condition includes a preset precision or a preset number of training.

According to an aspect of the present disclosure, a server is provided, including: a processor, and a memory storing programs, the programs including instructions, which, when executed by a processor, cause the processor to carry out the video public opinion acquisition method in the present disclosure.

According to an aspect of the present disclosure, a computer-readable storage medium storing programs is provided, the programs including instructions, which, when executed by a processor of a server, cause the server to carry out the video public opinion acquisition method in the present disclosure.

According to an aspect of the present disclosure, a server is provided, including: a processor, and a memory storing programs, the programs including instructions, which, when executed by a processor, cause the processor to carry out the word viscosity model training method in the present disclosure.

According to an aspect of the present disclosure, a computer-readable storage medium storing programs is provided, the programs including instructions, which, when executed by a processor of a server, cause the server to carry out the word viscosity model training method in the present disclosure.

According to an aspect of the present disclosure, the video public opinion acquisition method can recognize text information in a fine-grained manner, thereby improving the accuracy of text recognition.

According to embodiments described below, these and other aspects of the present disclosure are clear, and will be explained with reference to the embodiments described below.

BRIEF DESCRIPTION OF THE SEVERAL VIEWS OF THE DRAWINGS

The embodiments are shown, in some embodiments, in accompanying drawings, which constitute one part of the description, and are used to explain example implementations of the embodiments together with text descriptions of the description. The embodiments shown are for the purpose of illustration only, and are not intended to limit the scope of claims. In all the accompanying drawings, identical numerals refer to similar but not identical elements.

DETAILED DESCRIPTION

In the present disclosure, unless otherwise specified, use of terms "first", "second", etc., to describe various elements is not intended to limit the positional relationship, timing relationship, or importance relationship of these elements. Such terms are only used for distinguishing one element from another. In some examples, a first element and a second element may refer to the same instance of the element, and in some cases, they may also refer to different instances based on the description of the context.

The terms used in the description of the various examples in the present disclosure are for the purpose of describing specific examples only, and are not intended for limitation. Unless the context clearly indicates otherwise, if the number of elements is not specifically limited, there may be one or more elements. In addition, the term "and/or" used in the present disclosure covers any one and all possible combinations of the listed items.

Due to the recent significant increase in the user scale of short video media platforms, a large number of online public opinions are fermented and disseminated through short videos, and public opinion monitoring for short video media is becoming more and more important for public opinion products. Video contents are parsed and recognized by the video public opinion monitoring and analysis capacity to help customers quickly grasp the public opinion information of short videos and public opinion development trend, and meet the demands of the customers for video public opinion monitoring.

The embodiments of the present disclosure will be described in detail below in combination with the accompanying drawings.

Figure 1:
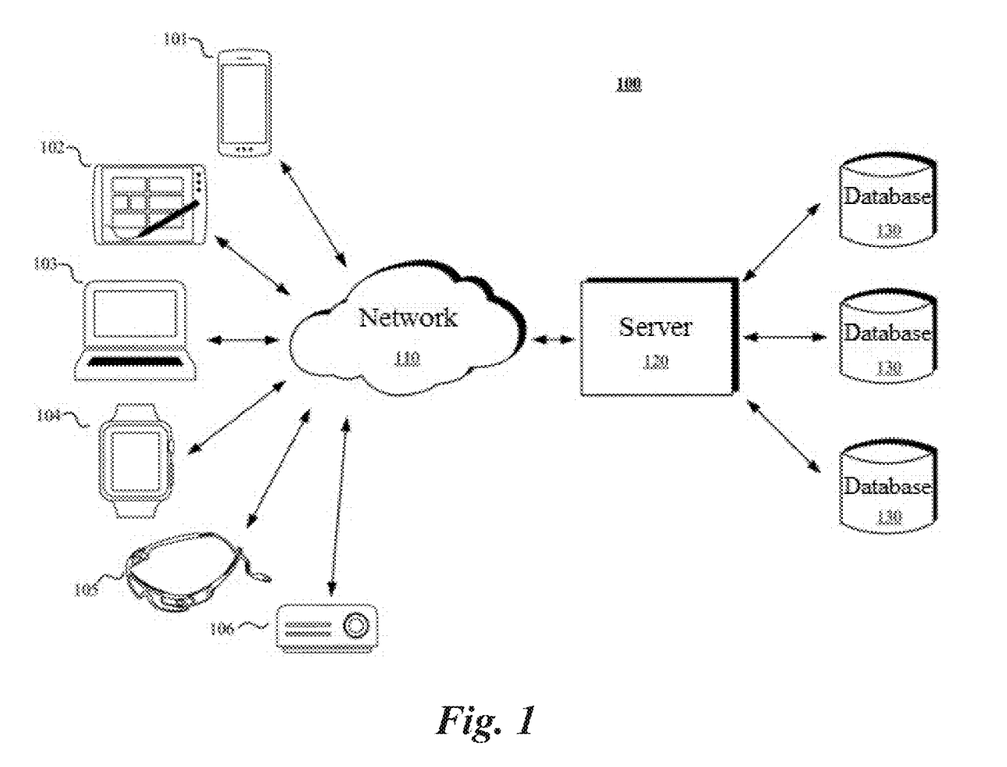
FIG. 1 illustrates a schematic diagram of an example system, in which various methods described herein can be implemented, according to the embodiments of the present disclosure.

FIG. 1 illustrates a schematic diagram of an example system 100, in which various methods and apparatuses described herein can be implemented, according to the embodiments of the present disclosure. Referring to FIG. 1, the system 100 includes one or more client devices 101, 102, 103, 104, 105 and 106, a server 120, and one or more communication networks 110 for coupling the one or more client devices to the server 120. The client devices 101, 102, 103, 104, 105 and 106 may be configured to execute one or more application programs.

In the embodiments of the present disclosure, the server 120 may run one or more services or software applications that enable a method for acquiring video public opinions.

In some embodiments, the server 120 may also provide other services or software applications that may include non-virtual environments and virtual environments. In some embodiments, these services may be supplied as web-based services or cloud services, and may be supplied to users of the client devices 101, 102, 103, 104, 105, and/or 106, for example, under software as a service (SaaS) model.

In the configuration shown in FIG. 1, the server 120 may include one or more components that realize a function executed by the server 120. These components may include a software component, a hardware component, or a combination thereof executed by one or more processors. The user operating the client devices 101, 102, 103, 104, 105, and/or 106 can employ one or more client application programs in sequence to interact with the server 120, in order to employ the services supplied by these components. It should be understood that various different system configurations are possible, and may be different from the system 100. Therefore, FIG. 1 is one example of a system used for implementing various methods described herein, and is not intended for limitation.

The user can use the client devices 101, 102, 103, 104, 105, and/or 106 to initiate a video public opinion acquisition request and/or word viscosity model training. The client devices can supply an interface that causes the user of the client devices to interact with the client devices. The client devices can also output information to the user via this interface. Although FIG. 1 only illustrates six client devices, those skilled in the art will understand that the present disclosure can support any number of client devices.

The client devices 101, 102, 103, 104, 105, and/or 106 can include various types of computing systems, such as portable handheld devices, general-purpose computers (such as personal computers and laptop computers), workstation computers, wearable devices, gaming systems, thin clients, various message transceiving devices, sensors, or other sensing devices. These computing devices can run various types and versions of software application programs and operating systems, such as Microsoft Windows, Apple iOS, UNIX-like operating systems, Linux or Linux-like operating systems (such as Google Chrome OS); or include various mobile operating systems, such as Microsoft Windows Mobile OS, iOS, Windows Phone, Android. The portable handheld devices may include cellular phones, smart phones, tablet computers, personal digital assistants (PDA), and the like. The wearable devices may include head-mounted displays and other devices. The gaming systems may include various handheld gaming devices, Internet-enabled gaming devices, and the like. The client devices can execute various different application programs, such as various Internet-related application programs, communication application programs (such as email application programs) and short message service (SMS) application programs, and can use various communication protocols.

The network 110 may be any type of network well known to those skilled in the art, which may use any one of a variety of available protocols (including but not limited to TCP/IP, SNA, IPX, etc.) to support data communication. For example only, the one or more networks 110 may be a local area network (LAN), an Ethernet-based network, a token ring, a wide area network (WAN), an Internet, a virtual network, a virtual private network (VPN), an intranet, an extranet, a public switched telephone network (PSTN), an infrared network, a wireless network (such as Bluetooth, WIFI) and/or any combination of these and/or other networks.

The server 120 may include one or more general-purpose computers, dedicated server computers, for example, personal computers (PC) servers, UNIX servers, and mid-range servers, blade servers, mainframe computers, server clusters, or any other suitable arrangement and/or combination. The server 120 may include one or more virtual machines running a virtual operating system, or other computing architectures, for example, one or more flexible pools of logical storage devices that may be virtualized to maintain virtual storage devices of a server, involving virtualization. In various embodiments, the server 120 may run one or more services or software applications that provide the functions described below.

The computing system in the server 120 may run one or more operating systems including any of the above-mentioned operating systems and any commercially available server operating systems. The server 120 may also run any one of various additional server application programs and/or middle-tier application programs, including an HTTP server, an FTP server, a CGI server, a JAVA server, a database server, etc.

In some implementations, the server 120 may include one or more application programs to analyze and merge data feedbacks and/or event updates received by the user of the client devices 101, 102, 103, 104, 105, and 106. The server 120 may also include one or more application programs to display data feedbacks and/or real-time events via one or more display devices of the client devices 101, 102, 103, 104, 105, and 106.

The system 100 may also include one or more databases 130. In some embodiments, these databases can be used to store data and other information. For example, one or more of the databases 130 may be used to store information such as audio files and video files. The data repository 130 may reside in various positions. For example, the data repository used by the server 120 may be local to the server 120, or may be away from the server 120 and may in communication with the server 120 via a network-based or dedicated connection. The data repositories 130 may be of different types. In some embodiments, the data repository used by the server 120 may be a database, such as a relational database. One or more of these databases can store, update, and retrieve the database and data from the database in response to a command.

In some embodiments, one or more of the databases 130 may also be used by application programs to store application program data. The databases used by the application programs can be different types of databases, such as a key-value repository, an object repository, or a regular repository supported by a file system.

The system 100 of FIG. 1 can be configured and operated in various ways so that various methods and devices described according to the present disclosure can be applied.

Figure 2:
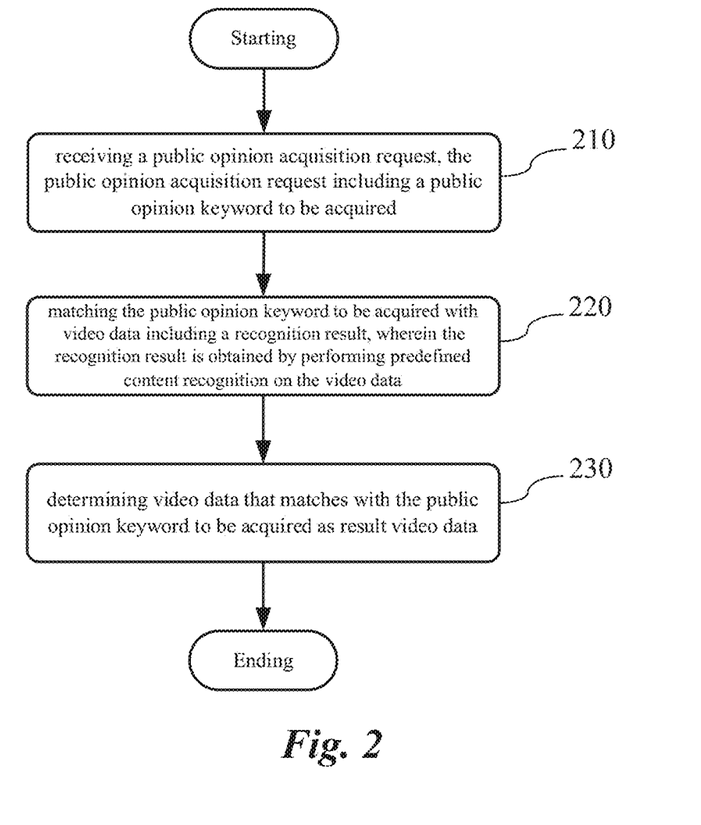
FIG. 2 illustrates a flow diagram of a video public opinion acquisition method according to the embodiments of the present disclosure.

According to the example embodiment of the present disclosure, as shown in FIG. 2, a video public opinion acquisition method is provided, including: receiving a public opinion acquisition request, the public opinion acquisition request including a public opinion keyword to be acquired (step 210); matching the public opinion keyword to be acquired with video data including a recognition result, wherein the recognition result is obtained by performing predefined content recognition on the video data, the predefined content recognition including text recognition and image recognition (step 220); and determining video data that matches with the public opinion keyword to be acquired as result video data (step 230).

According to some embodiments of the present disclosure, the video public opinion acquisition method can recognize text information in a fine-grained manner, thereby improving the accuracy of text recognition.

According to some embodiments, performing the predefined content recognition on the video data includes: regularly acquiring source video data from a video source; filtering the acquired source video data according to a predefined condition; and transcoding the filtered source video data into a predefined format for the predefined content recognition.

According to some embodiments, the predefined condition includes one or more of: a video duration, a video type, and a publication date.

In some examples, the video data acquired from the video source is firstly transcoded into a uniform format and resolution, and then is filtered according to the predefined condition. The predefined condition includes the video duration, the video type, and the publication date. For example, video data having a video duration longer than 5 minutes is filtered out; video data of a "funny" video type is filtered out; and video data of which the publication date is before 2018 is filtered out. A filter rule may be specifically set according to requirements of a customer, and no limitation is made here.

By setting filter conditions, the accuracy of the video data used for public opinion analysis is improved. Since a long video is possibly a movie clip, etc., and some types of video data (such as funny videos) are not of great value for public opinion analysis, thereby further saving computing resources, and improving the operation efficiency.

According to some embodiments, the text recognition includes: extracting frames from a video of the video data to obtain a picture of each extracted frame; recognizing a text in the picture as text information; and extracting keywords from the text information the recognition result.

In some examples, pictures are extracted by frame from an acquired video, for example, one frame is extracted per second. For example, Characters in the extracted video pictures is recognized by, for example, an optical character recognition (OCR) technology. For the recognized characters, keyword extraction can be performed using a keyword extraction algorithm, and a keyword is a word capable of reflecting a text subject or a main content. Algorithms that can be used for keyword extraction include, but are not limited to: a TF-IDF keyword extraction method, a Topic-model keyword extraction method and a RAKE keyword extraction method, a TextRank algorithm, an LDA algorithm, a TPR algorithm, and the like.

In some examples, speech information in the video is extracted, and extracted speeches are converted into characters using an automatic speech recognition (ARS) technology. Keyword extraction on the converted characters is performed using the keyword extraction algorithm, and algorithms which can be used for keyword extraction include, but are not limited to: a TF-IDF keyword extraction method, a Topic-model keyword extraction method and a RAKE keyword extraction method, a TextRank algorithm, an LDA algorithm, a TPR algorithm, and the like.

According to some embodiments, the text recognition includes: acquiring a surrounding text of the video as text information, wherein the surrounding text includes one or more of: a title, a description text, and a speech text; performing word segmentation processing on the text information; inputting words obtained through the word segmentation processing into the trained word viscosity model, so as to obtain, for each word of the words, a probability of the word being connected with a latter word thereof; filtering words having probabilities greater than a threshold probability; and forming one or more key phrases using the words having the probabilities greater than the threshold probability as the recognition result.

The key phrase refers to a typical and representative phrase in a sentence, and may express a key content of the sentence. A key phrase usually includes a plurality of words. For example, "Baidu International Building" may usually form one key phrase including three words: "Baidu", "International", and "Building". In some examples, characters in pictures extracted by frame from the video and characters in video speeches, and characters of all parts such as a video title, a video description and video comments are performed keyword recognition and/or key phrase recognition in a customized manner, which includes jointly recognizing the characters recognized from the plurality of parts, separately recognizing the characters of each part, and the like, and no limitation is made.

The foregoing "connection" indicates that the word and the latter word may appear together as a phrase. The phrase here does not necessarily mean only including a previous word and a latter word, and may also include a word or phrase behind the latter word. For example, for "Baidu International Building", the probability of "Baidu" being connected with "International" can be obtained, and the probability of connecting of "International" with "Building" can also be obtained. When the probability is greater than the threshold probability (for example, 0.8), the word and the latter word, of which the probability of connection is greater than the threshold probability, form a key phrase. If the probability of connection of each of one or more continuous words and its latter word is greater than the threshold probability, for example, the probabilities of both connection of "Baidu" to "International" and connection of "International" to "Building" are greater than the threshold probability, the above continuous words form a key phrase, that is, the key phrase "Baidu International Building" can be obtained.

The probability of connecting of the previous word with the latter word can be quickly determined through the trained word viscosity model, and then the respective key phrases are quickly obtained according to the probability, and the recognition rate is relatively high.

According to some embodiments, forming one or more key phrases using the words having the probabilities greater than the threshold probability as the recognition result includes: obtaining an inverse document frequency of each word in a formed key phrase; calculating a sum of the inverse document frequencies of all words in the key phrase to be an inverse document frequency of the key phrase; and selecting a predetermined number of key phrases with higher inverse document frequencies than other key phrase of the one or more key phrases as the recognition result.

The main idea of the inverse document frequency (IDF) is that: if there are fewer documents containing the word A, its IDF is larger, which indicates that the word A has an extremely good type distinguishing capacity on the entire document set level. For example, common Chinese words, such as "I", "LE", "am" and "of", have a very high word frequency nearly in every document. For an entire document set, these words are less important. For the entire document set, the standard for evaluating the importance of a word is IDF. In some examples, the IDFs of a series of words can be respectively calculated and stored by building an IDF calculation model and a database. After the key phrase is generated, the IDF of each word included in the key phrase is read in the database, and the acquired IDFs are summated to obtain the IDF of the key phrase. An IDF threshold of the key phrase can be set, and one or more key phrases with the highest IDF is selected as the recognition result. It should be understood that all the key phrases extracted may also be used as the recognition result.

The extracted key phrases are filtered by calculating the IDFs of the key phrases, so that the extracted key phrases can better reflect the characteristic of the video content, and the accuracy of video content extraction is improved.

According to some embodiments, the method further includes: performing an emotion analysis on the text information, the emotion analysis including analyzing one or more of positive emotion, neutral emotion or negative emotion; and performing sensitivity recognition, i.e., sensitive information recognition, on the text information.

In some example, an entity recognition technology may be used to recognize entities in the extracted text information. For each sentence in the text information, a sentence emotion analysis technology may be used to perform analysis, so as to filter out sentences that show no obvious emotion and further filter out sentences that do not include any entity to form entity-sentence pairs. Weighted summation is performed on the emotions of all the entities of the sentence according to the IDFs, i.e., weights (for example, a normalized form), of the entities of the formed entity-sentence pairs, so as to obtain an emotion analysis result of the text information.

In some examples, the emotion analysis result may be, for example, positive emotion, neutral emotion and negative emotion. In the system of the present example embodiment, one word library containing emotions can be built at first, and all words in the word library correspond to the respective emotion labels, such as positive, neutral or negative. The recognized entities are compared with the words in the word library to acquire emotions corresponding to the entities. Therefore, the weighted summation is performed on the emotions of all the entities in the sentences, according to the IDFs of the entities, to acquire the probabilities of the positive emotion, neutral emotion and negative emotion included in the text information.

In some examples, a sensitive word library can be built at first. The acquired text information is compared with the sensitive word library to confirm whether the text information includes sensitive information.

According to some embodiments, the image recognition includes face recognition, wherein performing predefined content recognition on the video data includes: extracting frames from a video of the video data to obtain a picture of each extracted frame; recognizing a face in the picture; and determining, based on a face database, the name corresponding to the face.

In some examples, a preset face recognition model can be employed to perform face recognition on the image of the extracted video frame and obtain a face recognition result, wherein the face detection and recognition result may be, for example, a target object corresponding to the face. In the system of the present example embodiment, one face library including specific public persons/sensitive persons may be built at first; the face in the picture is detected, and similarity measurement is performed on a face region with each face in the face library. If the maximum similarity is greater than a threshold, "XXX" (the name of a specific public person/sensitive person, for example, the full name) is labeled on this face, or it is deemed as "other faces".

According to some embodiments, the image recognition further includes: scenario recognition, entity recognition and identity recognition, wherein performing predefined content recognition on the video data includes: extracting frames from a video of the video data to obtain a picture of each extracted frame; recognizing a scenario in the picture; recognizing an entity in the picture; and recognizing an identity in the picture.

In some examples, for example, a preset scenario recognition model can be employed to perform scenario recognition on an image of a key frame, and determine a scenario prediction result in the image, wherein the scenario prediction result may at least include: hospitals, campuses, shopping malls, squares, parks, banks, and other site scenarios, and may also include: fire, weddings, geological disasters, and other event scenarios.

In some examples, for example, a preset entity recognition model can be employed to perform entity recognition on an image of a key frame, and determine an entity prediction result in the image, wherein the entity prediction result may at least include: a series of entities such as cars, flowers, flags, and roads.

In some examples, a preset identity recognition model can be employed to perform identity recognition on an image of a key frame, and determine an identity prediction result in the image. The identities according to the example embodiment may include a brandmark, a logo, and the like.

According to some embodiments, the public opinion acquisition request further includes a public opinion keyword to be filtered out, wherein determining the matched result video data includes: filtering the video data that includes the recognition result based on the public opinion keyword to be filtered out; and determining the filtered video data as the result video data.

According to some embodiments, the result video data can be transmitted to a client for displaying, i.e., recalling. Before display, the matched video data is further subjected to semantic matching with the public opinion keyword to be filtered out in the public opinion acquisition request, so as to transmit the filtered video data to the client for displaying.

According to the embodiments of the present disclosure, the video content is recognized and extracted in fine-grained way to cause the video content to be understood more fully and be higher in accuracy. More complete modeling of the video content greatly increases the recall rate.

Figure 3:
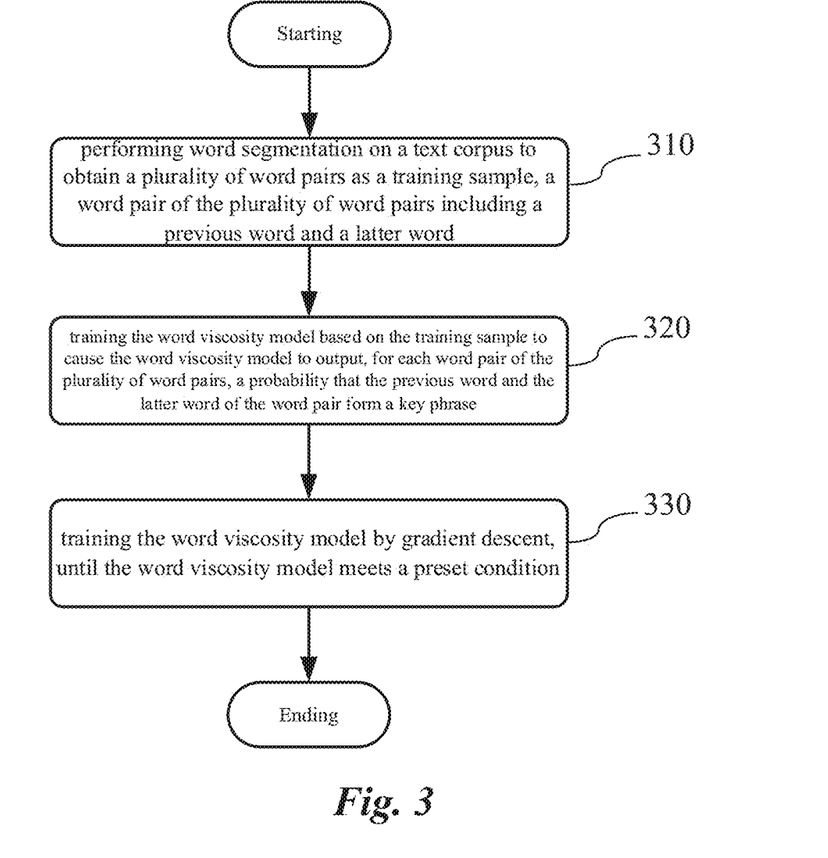
FIG. 3 illustrates a flow diagram of a word viscosity model training method according to the embodiments of the present disclosure.

According to an example embodiment of the present disclosure, as shown in FIG. 3, a word viscosity model training method is provided, including: performing word segmentation on a text corpus to obtain a plurality of word pairs as a training sample, a word pair of the plurality of word pairs including a previous word and a latter word (step 310); training a word viscosity model based on the training sample to cause the word viscosity model to output a probability that each word pair may form a key phrase (step 320); and training the word viscosity model by gradient descent, until the word viscosity model meets a preset condition, wherein the preset condition includes a preset precision or a preset number of training (step 330).

According to some embodiments, performing word segmentation on the text corpus to obtain a plurality of word pairs includes: performing word segmentation processing on the text corpus; setting a latter word window, wherein the latter word window represents a number of words that can form word pairs with previous words behind positions of the previous words in the text corpus; for each word in the latter word window, setting a probability that the word in the latter word window can form a word pair with the previous word, wherein the probability decreases in turn according to the order in the text corpus; and acquiring the word pairs, as the training sample, according to the latter word window and the probability.

In some example embodiments, during training of the word viscosity model, the text corpus is sampled at first to obtain the training sample. The training sample obtained by sampling the text corpus is the word pairs including the previous words and the latter words. In the sampling process, a latter word window size is set at first. The window size represents how many words behind each word are sampled. For example, for each word in the text corpus, its latter word window size is set to be 4, which represents that 4 words behind each word may be selected, and words behind the fourth word may not be selected.

After the latter word window size is set, an attenuation rate can be set, so as to determine, based on the attenuation rate, a probability that each word of the latter words, which can be selected, can form a word pair with the previous word. A higher probability indicates that a word is more likely to be selected to form a word pair with the previous word. For example, a discounting algorithm is used to set the probability. For example, the attenuation rate can be set to be 0.3, i.e., the probability that, in the window, a second word is selected is 30% of the probability that a first word is selected, and the probability that a third word is selected is 30% of the probability that the second word is selected, and the rest can be done in the same manner. For example, a random number (greater than 0) is given to a first word in the latter word window to represent the probability that the first word is selected, and the probabilities that the second word, the third word, . . . , in the latter word window are selected are set in sequence according to the attenuation rate. The probability of each word in the latter word window is normalized to cause the sum of all the probabilities in the latter word window to be 1 and meet attenuation rate conditions: in the window, the probability that the second word is selected is 30% of the probability that the first word is selected, and the probability that the third word is selected is 30% of the probability that the second word is selected, and the rest can be done in the same manner. For example, when the latter word window size is 4, the probabilities that each word in one group of latter word windows is selected are set to be [0.71, 0.21, 0.06, 0.02]. A certain latter word in the latter word window is selected according to the probability value, so as to form a word pair with the previous word, thereby obtaining a large batch of word pairs including the previous words and the latter words as the training sample.

It can be understood that if a frequency that a certain word pair is sampled is very high, it is indicated that two words in the word pair are higher in viscosity; otherwise, it is indicated that the two words is lower in viscosity.

After sampling is completed, the word viscosity model can be trained according to the collected training sample, wherein gradient descent is used to train the model and fit training data.

According to some embodiments, training the word viscosity model based on the training sample includes: respectively converting the previous words and the latter words in the input word pairs into vector data; calculating a cosine similarity between the converted vector data; and converting the cosine similarity into the probability.

In some examples, the word viscosity model can use a multilayer neural network model. For example, a word2vec algorithm can be used to map two input words to vectors. Word2vec (word to vector) is a tool for converting a word into a vector form. In this way, the processing for the text content can be simplified into vector operation in a vector space, and a similarity in the vector space is calculated to represent a semantic similarity of a text. It can be understood that other algorithms or models that can be used for converting the input words into vectors are also possible, such as autoencoder.

In some examples, for example, a sigmoid function can be used to convert a similarity into a probability. The sigmoid function is also called a logistic function, and is used for outputting a hidden layer neuron. It can map one real number to a range (0,1). It can be understood that other algorithms or models that can be used for converting similarities into vectors are also possible, and no limitation is made.

In some examples, word segmentation is performed on the text to be extracted, and a viscosity threshold is set and a viscosity between the previous and latter words is determined. If the viscosity is greater than 0.8, the words are connected to form a phrase. It is assumed that the word segmentation is performed on the input text according to a word order to obtain: A/B/C/D/E/F/G, and word pairs of AB, BC, CD, DE, EF and FG are formed and input into the word viscosity model to obtain a word viscosity therebetween (i.e., the probability of connection). For example, the viscosities calculated between the words are: A and B [0.93], B and C [0.31], C and D [0.95], D and E [0.85], E and F [0.88], and F and G [0.75], respectively. When the threshold is 0.8, phrases that may be generated are AB, CDEF and G.

By means of the trained word viscosity model, the key phrases included in a document can be extracted more accurately and efficiently; and furthermore, the precision and the number of the key phrases to be extracted are further controlled by setting the viscosity threshold.

Figure 4:
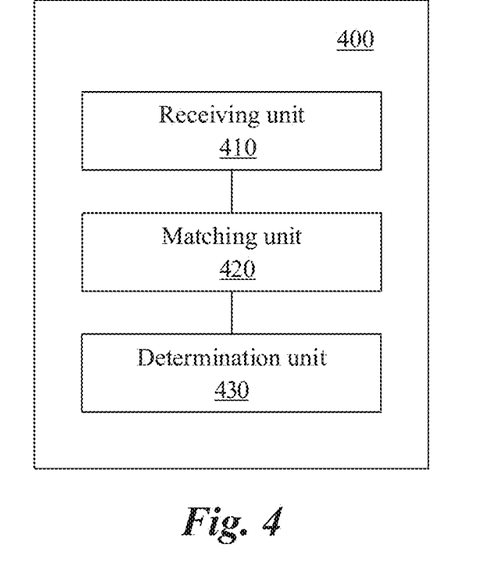
FIG. 4 illustrates a structural block diagram of a video public opinion acquisition device according to the embodiments of the present disclosure.

According to an example embodiment of the present disclosure, as shown in FIG. 4, a video public opinion acquisition device 400 is provided, including: a receiving unit 410, configured to receive a public opinion acquisition request, wherein the public opinion acquisition request includes a public opinion keyword to be acquired; a matching unit 420, configured to match the public opinion keyword to be acquired with video data including a recognition result, wherein the recognition result is obtained by performing predefined content recognition on the video data, the predefined content recognition including text recognition and image recognition; and a determination unit 430, configured to determine video data that matches with the public opinion keyword to be acquired as result video data.

According to some embodiments, performing the predefined content recognition on the video data includes: regularly acquiring source video data from a video source; filtering the acquired source video data according to a predefined condition; and transcoding the filtered source video data into a predefined format for the predefined content recognition.

According to some embodiments, the predefined condition includes one or more of: a video duration, a video type, and release time.

According to some embodiments, the text recognition includes: extracting frames from a video of the video data to obtain a picture of each extracted frame; recognizing a text in the picture as text information; and extracting keywords from the text information as the recognition result.

According to some embodiments, the text recognition includes: acquiring a surrounding text of the video as text information, wherein the surrounding text includes one or more of: a title, a description text, and a speech text; performing word segmentation processing on the text information; inputting words obtained through the word segmentation processing into the trained word viscosity model, so as to obtain, for each word of the words, a probability of the word being connected with a latter word thereof; filtering the words having probabilities greater than a threshold probability; and forming one or more key phrases using the words having the probabilities greater than the threshold probability as the recognition result.

According to some embodiments, forming one or more key phrases using the words having the probabilities greater than the threshold probability as the recognition result includes: obtaining an inverse document frequency of each word in a formed key phrase; calculating a sum of the inverse document frequencies of all words in the key phrase to be an inverse document frequency of the key phrase; and selecting a predetermined number of key phrases with the higher inverse document frequencies than other key phrase of the one or more key phrases as the recognition result.

According to some embodiments, the text recognition further includes: performing an emotion analysis on the text information, the emotion analysis including analyzing one or more of positive emotion, neutral emotion or negative emotion; and performing sensitivity recognition, i.e., sensitive information recognition, on the text information.

According to some embodiments, the image recognition includes face recognition, wherein performing predefined content recognition on the video data includes: extracting frames from a video of the video data to obtain a picture of each extracted frame; recognizing a face in the picture; and determining, based on a face database, a name corresponding to the face.

According to some embodiments, the image recognition further includes: scenario recognition, entity recognition and identity recognition, wherein performing predefined content recognition on the video data includes: extracting frames from a video of the video data to obtain a picture of each extracted frame; recognizing a scenario in the picture; recognizing an entity in the picture; and recognizing an identity in the picture.

According to some embodiments, the public opinion acquisition request further includes a public opinion keyword to be filtered out, wherein determining the matched result video data includes: filtering the video data that includes the recognition result based on the public opinion keyword to be filtered out; and determining the filtered video data as the result video data.

Here, the operations of all the above units 410 to 430 of the video public opinion acquisition device 400 are respectively similar to operations of the foregoing steps 210 to 230, and no repeated descriptions will be provided here.

Figure 5:
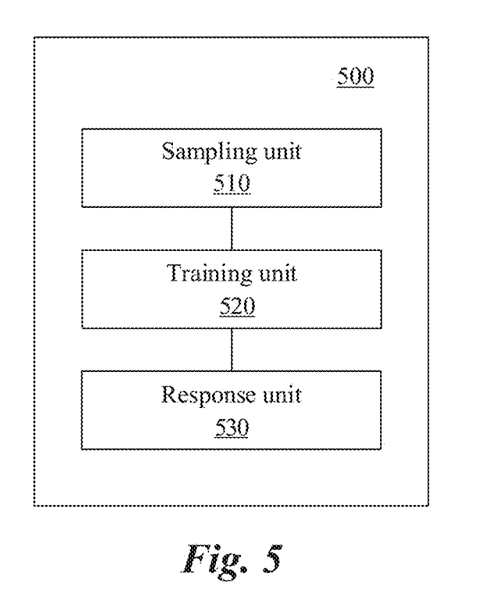
FIG. 5 illustrates a structural block diagram of a word viscosity model training device according to the embodiments of the present disclosure.

According to an example embodiment of the present disclosure, as shown in FIG. 5, a word viscosity model training device 500 is provided, including: a sampling unit 510, configured for performing word segmentation on a text corpus to obtain a plurality of word pairs as a training sample, a word pair of the plurality of word pairs including a previous word and a latter word; a training unit 520, configured for training the word viscosity model based on the training sample to cause the word viscosity model to output, for each word pair of the plurality of word pairs, a probability that the previous word and the latter word of the word pair may form a key phrase; and a response unit 530, configured for training the word viscosity model by gradient descent, until the word viscosity model meets a preset condition, wherein the preset condition includes a preset precision or a preset number of training.

According to some embodiments, performing word segmentation on the text corpus to obtain a plurality of word pairs includes: performing word segmentation processing on the text corpus; setting a latter word window, wherein the latter word window represents a number of words that can form word pairs with previous words and are behind positions of the previous words in the text corpus; for each word in the latter word window, setting a probability that the word in the latter word window can form word pairs with a previous word, wherein the probability decreases in turn according to an order in the text corpus; and acquiring the word pairs, as the training sample, according to the latter word window and the probability.

According to some embodiments, training the word viscosity model based on the training sample includes: respectively converting the previous words and the latter words in the input word pairs into vector data; calculating a cosine similarity between the converted vector data; and converting the cosine similarity into the probability.

Here, the operations of all the above units 510 to 530 of the word viscosity model training device 500 are respectively similar to operations of the foregoing steps 310 to 330, and no repeated descriptions will be provided here.

According to an aspect of the present disclosure, a server is also provided, including: a processor, and a memory storing programs, the programs including instructions, which, when executed by the processor, cause the processor to carry out the above-mentioned video public opinion acquisition method.

According to an aspect of the present disclosure, a computer-readable storage medium storing programs is provided, the programs including instructions, which, when executed by the processor of the server, cause the server to carry out the above-mentioned video public opinion acquisition method.

According to an aspect of the present disclosure, a server is provided, including: a processor, and a memory storing programs, the programs including instructions, which, when executed by the processor, cause the processor to carry out the above-mentioned word viscosity model training method.

According to an aspect of the present disclosure, a computer-readable storage medium storing programs is provided, the programs including instructions, which, when executed by the processor of the server, cause the server to carry out the above-mentioned word viscosity model training method.

Figure 6:
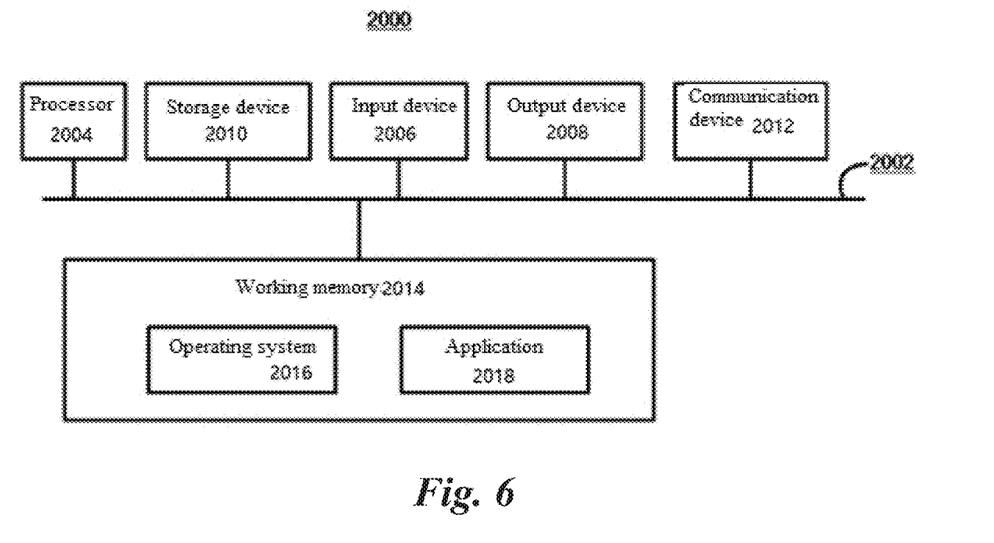
FIG. 6 illustrates a structural block diagram of an example server and client which can be used for realizing the embodiments of the present disclosure.

Referring to FIG. 6, a structural block diagram of a computing device 2000 that can be used as the server or client of the present disclosure will now be described, and it is an example of a hardware device that can be applied to all aspects of the present disclosure.

The computing device 2000 may include elements connected to a bus 2002 or in communication with the bus 2002 possibly via one or more interfaces. For example, the computing device 2000 may include a bus 2002, one or more processors 2004, one or more input devices 2006, and one or more output devices 2008. The one or more processors 2004 may be any type of processors, and may include, but are not limited to, one or more general-purpose processors and/or one or more special-purpose processors (for example, special processing chips). The processors 2004 may process instructions executed in the computing device 2000, including instructions stored in or on the memory to display graphical information of a GUI on an external input/output device (such as a display device coupled to an interface). In other implementations, multiple processors and/or multiple buses can be used together with multiple memories if necessary. Similarly, multiple computing devices can be connected, and each device provides part of the necessary operations (for example, as a server array, a group of blade servers, or a multi-processor system). In FIG. 6, one processor 2004 is taken as an example.

The input device 2006 can be any type of device that can input information to the computing device 2000. The input device 2006 can receive input numeric or character information and generate key signal inputs that are related to user settings and/or function control of a video public opinion acquisition and/or word viscosity model training computing device, and may include, but is not limited to, a mouse, a keyboard, a touch screen, a trackpad, a trackball, a joystick, a microphone, and/or a remote controller.

The output device 2008 may be any type of device that can present information, and may include, but is not limited to, a display, a speaker, a video/audio output terminal, a vibrator, and/or a printer. The computing device 2000 can also include a non-transitory storage device 2010 or be connected to the non-transitory storage device 2010. The non-transitory storage device can be any storage device that is non-transitory and can realize data storage, and can include, but is not limited to, a disk drive, an optical storage device, a solid-state memory, a floppy disk, a flexible disk, a hard disk, a magnetic tape or any other magnetic media, an optical disk or any other optical media, an ROM (read only memory), an RAM (random access memory), a cache memory and/or any other memory chips or cartridges, and/or any other medium from which a computer can read data, instructions, and/or codes. The non-transitory storage device 2010 can be removed from an interface. The non-transitory storage device 2010 may have data/programs (including instructions)/codes/units (for example, the receiving unit, the matching unit, and the determination unit shown in FIG. 4, as well as the sampling unit, the training unit, and the response unit shown in FIG. 5) used for implementing the above methods and steps.

The computing device 2000 may also include a communication device 2012. The communication device 2012 may be any type of device or system that enables communication with external devices and/or networks, and may include, but is not limited to, a modem, a network card, an infrared communication device, a wireless communication device, and/or a chipset, such as a Bluetooth™ device, a 1302.11 device, a WiFi device, a WiMax device, a cellular communication device and/or the like.

The computing device 2000 may also include a working memory 2014, which may be any type of working memory that can store programs (including instructions) and/or data useful for the work of the processor 2004, and may include, but is not limited to, a random access memory and/or a read only memory device.

The software elements (programs) may be located in the working memory 2014, and includes, but is not limited to, the operating system 2016, one or more application programs 2018, drivers, and/or other data and codes. Instructions for implementing the above methods and steps may be included in the one or more application programs 2018, and the above video public opinion acquisition and/or word viscosity model training methods may each be implemented by reading and executing instructions of the one or more application programs 2018 by the processor 2004. More specifically, in the foregoing video public opinion acquisition and/or word viscosity model training methods, step 110 to step 150 may be implemented, for example, by executing the application program 2018 having instructions of step 110 to step 150 by the processor 2004. In addition, other steps in the above-mentioned video public opinion acquisition and/or word viscosity model training methods can be implemented, for example, by executing the application program 2018 having instructions in the corresponding steps by the processor 2004. The executable code or source code of the instructions of the software element (program) can be stored in a non-transitory computer-readable storage medium (such as the above-mentioned storage device 2010), and can be stored in the working memory 2014 during execution (may be compiled and/or installed). The executable code or source code of the instructions of the software element (program) can also be downloaded from a remote location.

It should also be understood that various modifications can be made according to specific requirements. For example, customized hardware may also be used, and/or specific elements may be implemented by hardware, software, firmware, middleware, microcode, hardware description languages, or any combinations thereof. For example, some or all of the disclosed methods and devices can be implemented by programming, according to the logic and algorithms of the present disclosure, hardware (for example, a programmable logic circuit including a field programmable gate array (FPGA) and/or a programmable logic array (PLA)) using an assembly language or a hardware programming language (such as VERILOG, VHDL, C++).

It should also be understood that the foregoing methods can be implemented in a server-client mode. For example, a client can receive data input by a user and send the data to a server. The client can also receive the data input by the user, perform part of the processing in the foregoing methods, and send the data obtained by the processing to the server. The server can receive the data from the client, execute the foregoing methods or the other part of the foregoing methods, and return an execution result to the client. The client can receive the execution result of the methods from the server, and can, for example, present the execution result to the user through an output device. The client and the server are generally far away from each other and usually interact through a communication network. A relationship between the client and the server is generated by computer programs running on corresponding computing devices and having a client-server relationship with each other. The server can be a server of a distributed system or a server combined with a blockchain. The server can also be a cloud server, or a smart cloud computing server or smart cloud host with an artificial intelligence technology.

It should also be understood that the components of the computing device 2000 may be distributed on a network. For example, one processor may be used to perform some processing, while at the same time, another processor far away from the one processor may perform other processing. Other components of the computing device 2000 can also be similarly distributed. In this way, the computing device 2000 can be interpreted as a distributed computing system that performs processing in multiple locations.

Although the embodiments or examples of the present disclosure have been described with reference to the accompanying drawings, it should be understood that the above-mentioned methods, systems, and devices are merely example embodiments or examples, and the scope of the present disclosure is not limited by these embodiments or examples, and is only limited by the allowed claims and their equivalent scopes. Various elements in the embodiments or examples may be omitted or replaced by equivalent elements. In addition, all the steps may be performed in an order different from that described in the present disclosure. Further, various elements in the embodiments or examples can be combined in various ways. What is important is that as technology evolves, many elements described herein can be replaced by equivalent elements that appear after the present disclosure.

The various embodiments described above can be combined to provide further embodiments. Aspects of the embodiments can be modified to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A public opinion acquisition method, comprising:
   receiving a public opinion acquisition request, the public opinion acquisition request including a public opinion keyword to be acquired;
   matching the public opinion keyword to be acquired with video data including a recognition result, wherein the recognition result is obtained by performing predefined content recognition on the video data, the predefined content recognition including text recognition and image recognition; and
   determining video data that matches with the public opinion keyword to be acquired as result video data,
   wherein the text recognition comprises:
   acquiring a surrounding text of a video of the video data as text information, wherein the surrounding text includes one or more of: a title, a description text, and a speech text;
   performing word segmentation processing on the text information;
   inputting words obtained through the word segmentation processing into a trained word viscosity model, so as to obtain, for each word of the words, a probability of the word being connected with a latter word thereof;
   filtering words having probabilities greater than a threshold probability; and
   forming one or more key phrases using the words having the probabilities greater than the threshold probability as the recognition result.

2. The method according to claim 1, wherein the performing the predefined content recognition on the video data comprises:
   regularly acquiring source video data from a video source;

filtering the acquired source video data according to a predefined condition; and transcoding the filtered source video data into a predefined format for the predefined content recognition.

3. The method according to claim 2, wherein the predefined condition comprises one or more of: a video duration, a video type, and a publication date.

4. The method according to claim 1, wherein the text recognition comprises:

extracting frames from a video of the video data to obtain a picture of each extracted frame;

recognizing a text in the picture as text information; and extracting keywords from the text information as the recognition result.

5. The method according to claim 1, wherein the forming one or more key phrases using the words having the probabilities greater than the threshold probability as the recognition result comprises:

obtaining an inverse document frequency of each word in a formed key phrase;

calculating a sum of the inverse document frequencies of all the words in the key phrase to be the inverse document frequency of the key phrase; and selecting a predetermined number of key phrases with higher inverse document frequencies than other key phrase of the one or more key phrases as the recognition result.

6. The method according to claim 4, further comprising:

performing an emotion analysis on the text information, the emotion analysis including analyzing one or more of positive emotion, neutral emotion or negative emotion; and performing sensitivity recognition on the text information.

7. The method according to claim 1, wherein the image recognition comprises face recognition, and the performing the predefined content recognition on the video data comprises:

extracting frames from a video of the video data to obtain a picture of each extracted frame;

recognizing a face in the picture; and determining, based on a face database, a name corresponding to the face.

8. The method according to claim 1, wherein the image recognition comprises scenario recognition, entity recognition and identity recognition, and the performing the predefined content recognition on the video data comprises:

extracting frames from a video of the video data to obtain a picture of each extracted frame;

recognizing a scenario in the picture;

recognizing an entity in the picture; and recognizing an identity in the picture.

9. The method according to claim 1, wherein the public opinion acquisition request further comprises a public opinion keyword to be filtered out, and the determining the video data that matches with the public opinion keyword to be acquired comprises:

filtering the video data that includes the recognition result based on the public opinion keyword to be filtered out; and determining the filtered video data as the result video data.

10. The method according to claim 1, wherein the trained word viscosity model was trained by performing steps comprising:

performing word segmentation on a text corpus to obtain a plurality of word pairs as a training sample, a word pair of the plurality of word pairs including a previous word and a latter word;

training the word viscosity model based on the training sample to cause the word viscosity model to output, for each word pair of the plurality of word pairs, a probability that the previous word and the latter word of the word pair form a key phrase; and training the word viscosity model by gradient descent, until the word viscosity model meets a preset condition, wherein the preset condition includes a preset precision or a preset number of training.

11. The method according to claim 10, wherein the performing word segmentation on the text corpus to obtain the plurality of word pairs comprises:

performing word segmentation processing on the text corpus;

setting a latter word window, wherein the latter word window represents a number of words that can form word pairs with previous words and are behind positions of the previous words in the text corpus;

for each word in the latter word window, setting a probability that the word in the latter word window form a word pair with a previous word, wherein the probability decreases in turn according to an order in the text corpus; and acquiring the word pairs, as the training sample, according to the latter word window and the probability.

12. The method according to claim 10, wherein the training the word viscosity model based on the training sample comprises:

respectively converting the previous words and the latter words in the input word pairs into vector data;

calculating a cosine similarity between the converted vector data; and converting the cosine similarity into the probability.

13. A server, comprising:

a processor; and a memory storing programs, the programs comprising instructions, which, when executed by the processor, cause the processor to carry out acts, including:

receiving a public opinion acquisition request, the public opinion acquisition request including a public opinion keyword to be acquired;

matching the public opinion keyword to be acquired with video data including a recognition result, wherein the recognition result is obtained by performing predefined content recognition on the video data, the predefined content recognition including text recognition and image recognition; and determining video data that matches with the public opinion keyword to be acquired as result video data, wherein the text recognition comprises:

acquiring a surrounding text of a video of the video data as text information, wherein the surrounding text includes one or more of: a title, a description text, and a speech text;

performing word segmentation processing on the text information;

inputting words obtained through the word segmentation processing into a trained word viscosity model, so as to obtain, for each word of the words, a probability of the word being connected with a latter word thereof;

filtering words having probabilities greater than a threshold probability; and forming one or more key phrases using the words having the probabilities greater than the threshold probability as the recognition result.

14. The server according to claim 13, wherein the text recognition comprises:
   extracting frames from a video of the video data to obtain a picture of each extracted frame;
   recognizing a text in the picture as text information; and
   extracting keywords from the text information as the recognition result.

15. The server according to claim 13, wherein the forming one or more key phrases using the words having the probabilities greater than the threshold probability as the recognition result comprises:
   obtaining an inverse document frequency of each word in a formed key phrase;
   calculating a sum of the inverse document frequencies of all the words in the key phrase to be the inverse document frequency of the key phrase; and
   selecting a predetermined number of key phrases with higher inverse document frequencies than other key phrase of the one or more key phrases as the recognition result.

16. The server according to claim 13, wherein the performing the predefined content recognition on the video data comprises:
   regularly acquiring source video data from a video source;
   filtering the acquired source video data according to a predefined condition; and
   transcoding the filtered source video data into a predefined format for the predefined content recognition.

17. The server according to claim 13, wherein the image recognition comprises face recognition, and the performing the predefined content recognition on the video data comprises:
   extracting frames from a video of the video data to obtain a picture of each extracted frame;
   recognizing a face in the picture; and
   determining, based on a face database, a name corresponding to the face.

18. The server according to claim 13, wherein the image recognition comprises scenario recognition, entity recognition and identity recognition, and the performing the predefined content recognition on the video data comprises:
   extracting frames from a video of the video data to obtain a picture of each extracted frame;
   recognizing a scenario in the picture;
   recognizing an entity in the picture; and
   recognizing an identity in the picture.

* * * * *